United States Patent [19]

Dummer

[11] 4,220,901

[45] Sep. 2, 1980

[54] HALF AND FULL WAVE ENERGIZING SYSTEM FOR PERMANENT MAGNET D.C. MOTORS

[75] Inventor: Merlin R. Dummer, Arab, Ala.

[73] Assignee: Eaton Corporation, Cleveland, Ohio

[21] Appl. No.: 946,182

[22] Filed: Sep. 27, 1978

[51] Int. Cl.² .............................................. H02P 7/28
[52] U.S. Cl. ................................ 318/348; 318/345 F; 318/509; 310/50; 200/157
[58] Field of Search .................... 318/345 F, 348, 349, 318/504, 505, 509, 345 R, 245; 310/50; 363/126; 307/146, 151, 257; 200/157

[56] References Cited

U.S. PATENT DOCUMENTS

| | | | |
|---|---|---|---|
| 2,777,107 | 1/1957 | Medlar | 363/126 |
| 3,140,429 | 7/1964 | Mais | 361/154 |
| 3,461,375 | 8/1969 | Nestler | 363/126 |
| 3,518,522 | 6/1930 | Jaffe et al. | 318/349 |
| 3,588,411 | 6/1971 | Milcoy | 200/157 |
| 3,639,822 | 2/1972 | Brown et al. | 318/345 |
| 3,936,708 | 2/1976 | Dummer | 318/249 |

OTHER PUBLICATIONS

Lytel, A., *Electronic Motor Control*, Photofact Publication 1964, pp. 10–12.
Winchester, C. R. "Power-Supply Voltage Changed 2:1 with SPDT Arrangement", *Electronic Design*, 2-1-6-76, p. 174.

*Primary Examiner*—David Smith, Jr.
*Attorney, Agent, or Firm*—Robert J. McCloskey; Hugh R. Rather; Wm. A. Autio

[57] ABSTRACT

A half wave and full wave energization system for permanent magnet D.C. motors employing a hand trigger operated switch which commutates terminals of a full wave rectifier bridge when connected to a source of A.C. supply to provide selectively half wave and full wave energization of such motors when the trigger is depressed from an extended "off" position.

3 Claims, 10 Drawing Figures

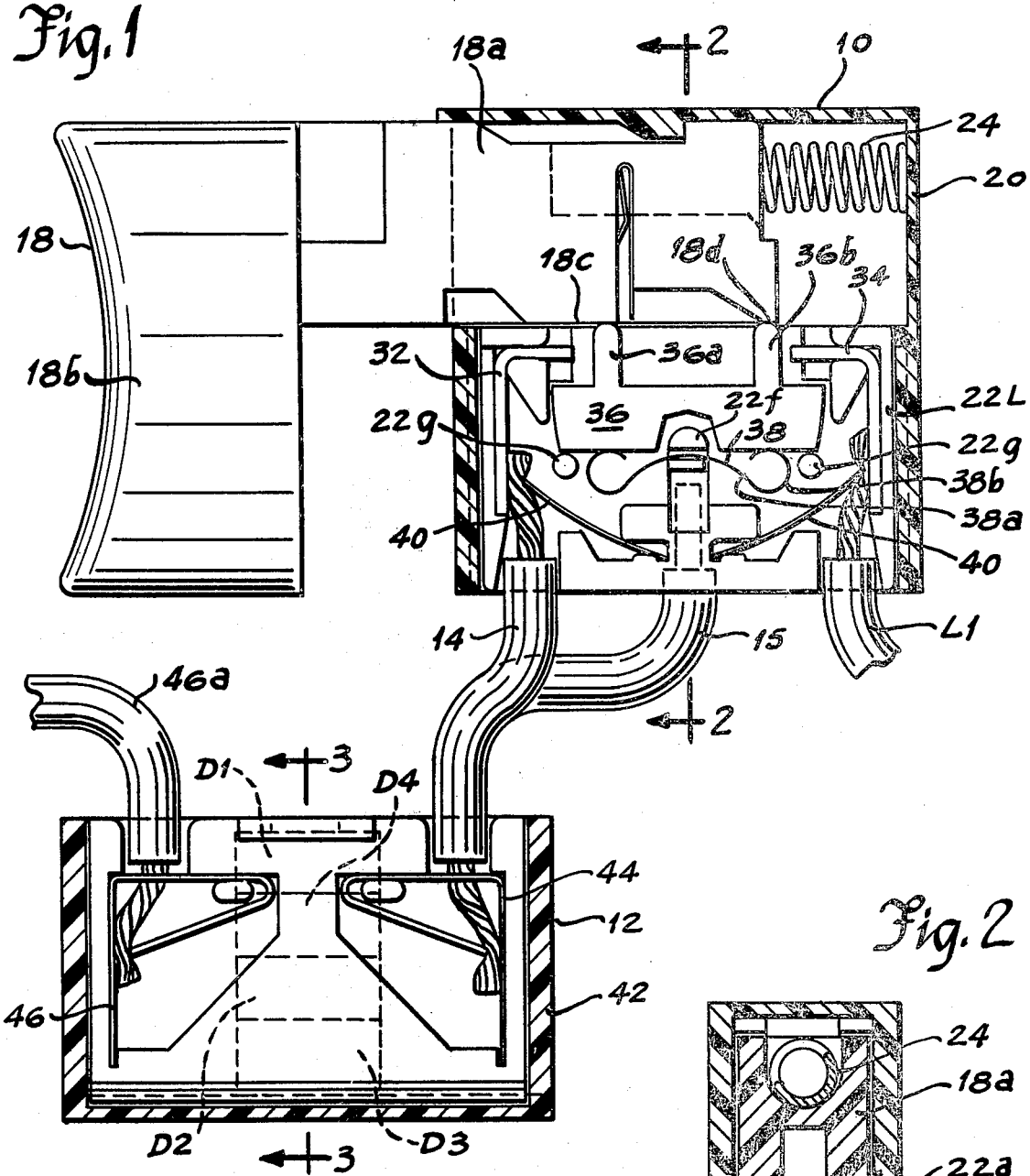
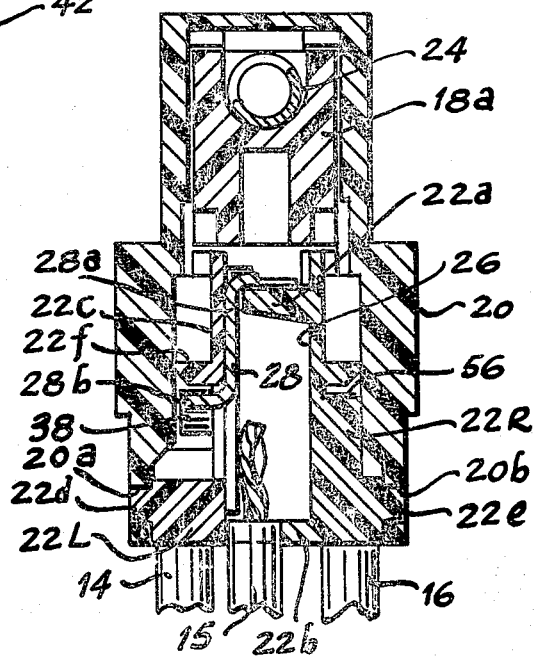
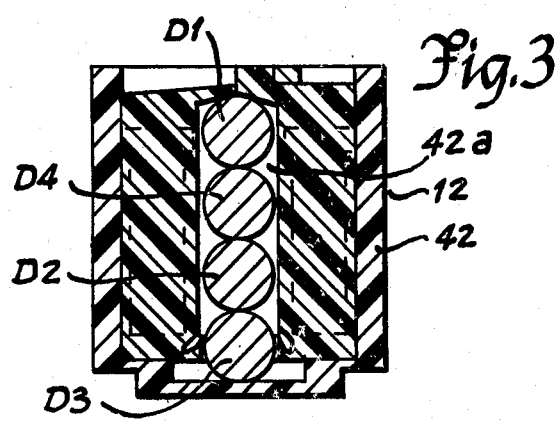

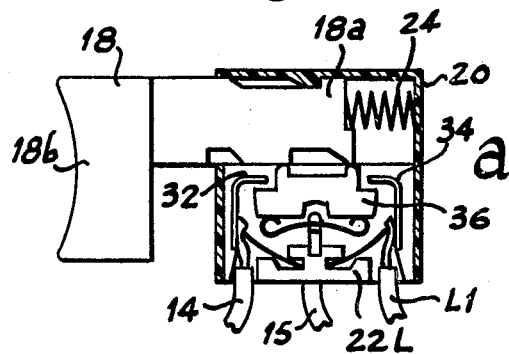
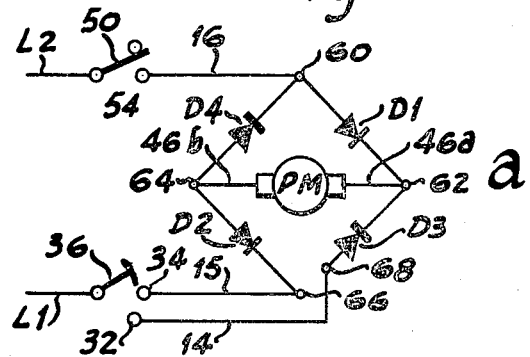
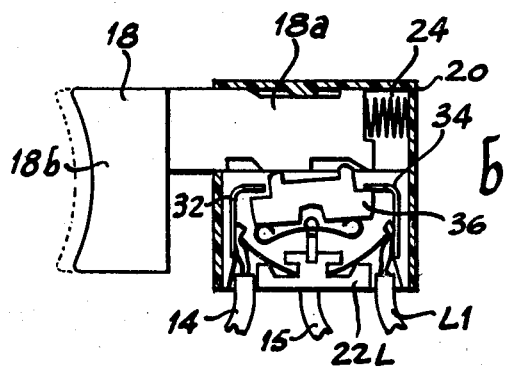
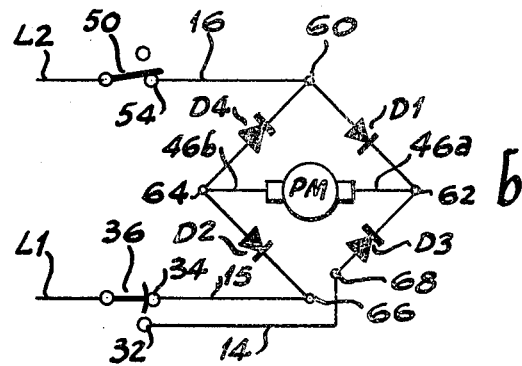
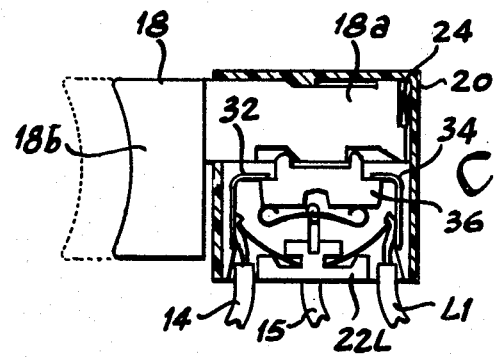
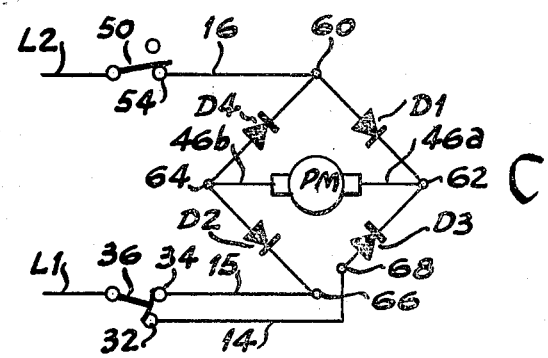
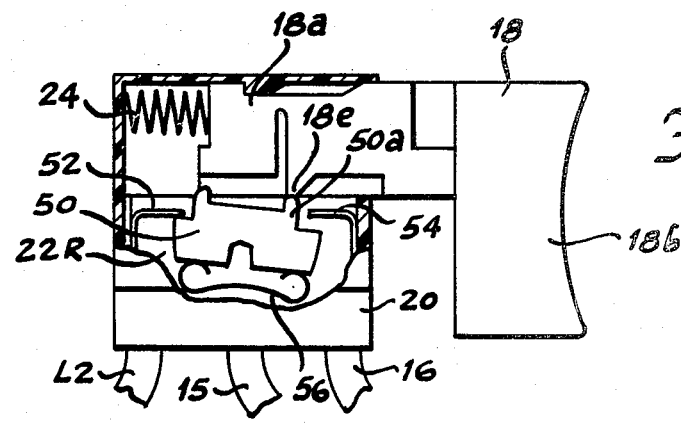

HALF AND FULL WAVE ENERGIZING SYSTEM FOR PERMANENT MAGNET D.C. MOTORS

BACKGROUND OF THE INVENTION

The use of full wave rectified A.C. energization of the armatures of permanent magnet motors is of course well known. Usually the armatures are connected across the D.C. output terminals of a full wave rectifier bridge wherein the individual rectifiers are usually of the uncontrolled type.

Certain types of portable tools have need for two motor speeds one of which is approximately half that of the other. A ready means of affording such dual speeds from existing full wave rectifier bridges is desirable.

OBJECTS OF THE INVENTION

It is a primary object of the present invention to provide a half and full wave energizing system for D.C. motors utilizing a portion and all of a full wave rectifier bridge, and A further object is to provide an energizing system of the aforementioned type employing a hand operated switch which commutates connections to the rectifier bridge to render a portion and all of the rectifiers of the bridge effective selectively.

Other objects of the invention will hereinafter appear.

BRIEF DESCRIPTION OF THE DRAWINGS

FIG. 1 is a view in longitudinal cross section of a two position speed control switch constructed in accordance with the invention.

FIG. 2 is a view in transverse cross section taken along the line 2—2 of FIG. 1.

FIG. 3 is a view in transverse cross section taken along the line 3—3 of FIG. 1.

FIGS. 4a to 4c are views of a portion of the speed control switch to a reduced scale depicting it in various operating positions.

FIGS. 5a to 5c are diagrammatic showings of an electric D.C. motor and how it is connected to a full wave bridge rectifier by the speed control device when in the operating postions depicted in FIGS. 4a to 4c, and FIG. 6 is a partially cut away view of the switch unit of FIG. 1, but taken on the opposite side.

DESCRIPTION OF THE PREFERRED EMBODIMENT

Referring to FIGS. 1 to 3 and 6, there is shown a two speed motor control device constructed in accordance with the invention. As shown therein, it generally comprises a trigger operated switch unit 10, and a full wave rectifier unit 12 that are interconnected by insulated wire conductors 14, 15, 16. In certain respects the switch unit 10 is similar to that shown in the Dummer U.S. Pat. No. 3,936,708, issued Feb. 3, 1976, to the assignee of the present application.

Switch unit 10 comprises a spring biased trigger 18 mounted for linear sliding movement in a switch housing. This housing comprises a frame 20 and a pair of split base halves, designated as a left base 22L and a right base 22R respectively. As most clearly shown in FIG. 2 frame 20 clamps the two halves of the split base together and also clamps slidable rear portion 18a of the trigger on top of the base 22L-22R so that the finger engaging portion 18b extends forwardly under the force of a trigger return spring 24 for depression by the forefinger of the user.

The base half 22R has upper and lower transverse ledges 22a and 22b which extend toward the left half 22L and provide an enclosed space generally designated 26. A metallic plate 28 has a vertical portion 28a that lies along the inner vertical wall 22c of base half 22L, and at its upper end portion 28a turns at a right angle and a free end thereof overlies the ledge 22a of the opposite base half. A right angle integrated tab 28b extends from the portion 28a through an opening in the wall 22c of 22L. The plate 28 is held in position by the interfit of the end of ledge 22a therealong and another ledge portion (not shown) that lies slightly above the ledge 22a. The frame 20 is provided with a pair of snap-in apertures 20a and 20b for receiving the projections 22d and 22e formed on the left and right halves of the bases 22L and 22R respectively. The conductor wire 15 has its bared end welded or soldered to the portion 28a of plate 28.

One pole of a double pole mechanism is mounted between the left side wall of the frame 20 and the left hand base 22L. This switch comprises stationary contacts 32 and 34, a movable butt contactor 36 and a leaf spring 38. The spring 38 has an intermediate portion 38a which is trapped between the tab 28b of the plate 28 and a boss 22f to insure electrical engagement between plate 28 and spring 38. Partially coiled end portions 38b of spring 38 bear against the lower side of the contactor 36.

Cam follower portions 36a and 36b in the normal position of trigger 18 bear at their rounded ends against the cam surfaces 18c and 18d found on the portion 18a of the trigger. In such normal position of the trigger the contactor 36 is held out of engagement with both of stationary contacts 32 and 34, and the lower surface of the contactor engages with the boss extensions 22g to limit the extent of downward movement of the contactor 36 in the base 22.

As shown in FIG. 1, an A.C. line conductor wire L1 extends through an opening in the lower end of the base 22L and the bared end thereof is connected to stationary contact 34 by a push-in type, leaf retainer spring 40. The wire conductor 14 is similarly connected at one end to the stationary contact 32, and at its other end is connected to a push-in type terminal 44 in the housing 42 of rectifier unit 12. The corresponding end of the wire conductor 15 may be assumed to be similarly connected to a like terminal member (not shown) mounted in-line with and electrically spaced from member 44 in the housing 42.

As best shown in FIG. 3 rectifiers D1 to D4 are mounted in a stacked relation within a cavity 42a in housing 42. Additional terminal clips 46 are placed in-line with and spaced apart relation in the left hand end of housing 42, and provide for attachment thereto of motor line conductors such as 46a and 46b shown in FIGS. 1 and 5. The connections between the rectifier D1 to D4 which occur within the housing 42, are shown in FIG. 5.

The switch mechanism in the right base 22R is essentially that depicted in FIG. 6. It has a movable contactor 50 similar to contactor 36, stationary contacts 52 and 54, and a coiled leaf spring 56 for biasing contactor 50 upwardly. The trigger portion 18a is provided with a cam surface 18e which bears against the cam follower extension 50a in the "off" extended position of trigger 18, thereby holding contactor 50 out of engagement from stationary contact 54 while permitting engagement of that contactor with stationary contact 52. It may be assumed that the stationary contacts 52 and 54 are similar to contacts 32 and 34 in base half 22L and have cooperating leaf type retainer springs to hold the bared wired ends of the conductors L2 and 16 in electrical engagement therewith.

As depicted in FIGS. 1, 4 and 6, switch 10 is biased to the "off" position by the spring 24, wherein the rectifier unit 20 is electrically disconnected from A.C. supply lines L1 and L2. Now if the trigger handle 18 is depressed to the extent shown in FIG. 4b, it may be assumed that the contactor 50 then contacts and bridges both of the stationary contacts, and that the contactor 36 then engages the stationary contact 34 to effect circuit completion from the plate 28, through spring 38, and contactor 36 to contact 34.

Thus an energizing circuit will be completed from line L2, through conductor 16, A.C. terminal 60, rectifier D1, to a D.C. terminal 62, then through the armature of a permanent magnet motor PM to the opposite D.C. terminal 64, and then through rectifiers D2 and one opposite A.C. terminal 66 to line L1. Accordingly, the motor PM connected between the D.C. terminals 62 and 64 of the rectifier bridge will be supplied with half wave unidirectional current pulses on alternate half cycles of the A.C. supply source. As will be seen in this first "on" position of the switch, the rectifier D3 and D4 are inactive.

If the trigger handle 18b is thereafter depressed further to the position depicted in FIG. 4c the contactor 36 will then engage both of the stationary contacts 32 and 34. A circuit will then be additionally completed between the plate 28 through spring 38, contactor 36, to contact 32. Thus as shown in FIG. 5c, an additional energizing circuit will thus be completed from line L1, conductor 14, a third A.C. terminal 68, rectifier D3, D.C. terminal 62, motor PM, D.C. terminal 64, rectifier D4, line 16 to line L2. It will be apparent that all of the rectifiers D1 to D4 will then be effective with rectifiers D3 and D4 conducting on the alternate half cycles of the A.C. supply source. Accordingly in this second "on" position of the switch, the permanent magnet motor PM will be provided with full wave rectified current and run at full speed.

The preferred form of switch unit and companion rectifier unit disclosed are particularly suitable for use in garden and lawn tools of configurations having rather slender handle housings. It will be apparent that these separate units could be combined in a single housing if desired.

I claim:

1. In a system for supplying a permanent magnet motor with half wave and full wave rectified current, the combination comprising:
    (a) a full wave rectifier bridge comprising four rectifiers which afford rectified current flow in a given direction between D.C. output terminals and having A.C. input terminals, and
    (b) switch means having first and second switch poles and operable from an "off" to first and second "on" positions, one of said switch poles in said first and second "on" positions connecting one A.C. input terminal to the opposed terminals of two of said rectifiers and the other of said switch poles in said first "on" position connecting the other A.C. input terminal to one terminal of a third rectifier and in the second "on" position connecting said other A.C. input terminal to said one terminal of said third rectifier and an opposed terminal of a fourth rectifier.

2. The combination according to claim 1 wherein the switch means is a hand trigger operated switch in which the trigger is spring biased to the "off" position and is movable against said bias to said first and second "on" positions which occur successively as said trigger is moved against said bias.

3. The combination according to claim 2 wherein said switch means and rectifier bridge are each provided with a separate housing, wherein there are flexible wire conductors connected to stationary contacts in said switch housing and to terminal in said rectifier bridge housing, and wherein A.C. line terminals are provided in said switch housing and motor lead terminals are provided in said rectifier bridge housing.

* * * * *